A. S. Bailey,
Elevator.

No. 100,103.  Patented Feb. 22, 1870.

Witnesses:
J. W. Munday.
D. Blakely.

Inventor
A. S. Bailey.
by L. L. Coburn.
Atty.

United States Patent Office.

ALSON S. BAILEY, OF CHICAGO, ILLINOIS.

Letters Patent No. 100,103, dated February 22, 1870.

IMPROVEMENT IN COAL-ELEVATORS.

The Schedule referred to in these Letters Patent and making part of the same

I, ALSON S. BAILEY, of Chicago, in the county of Cook, and State of Illinois, have invented certain Improvements in Coal-Elevators, of which the following is a specification.

My invention relates to a machine for elevating coal from the hold of a vessel, by means of trucks or buckets attached to endless chains and running on inclined tram-ways. The trucks or buckets are jointed transversely, so that they are readily carried by the chains in their circuit; and the whole machine is so jointed that the receiving end of the elevator may be placed in the hold of the vessel, from which the coal is lifted perpendicularly, after which it is carried along an incline to the place of deposit, all of which will more fully hereinafter appear.

Description of Accompanying Drawings.

Figure 1:
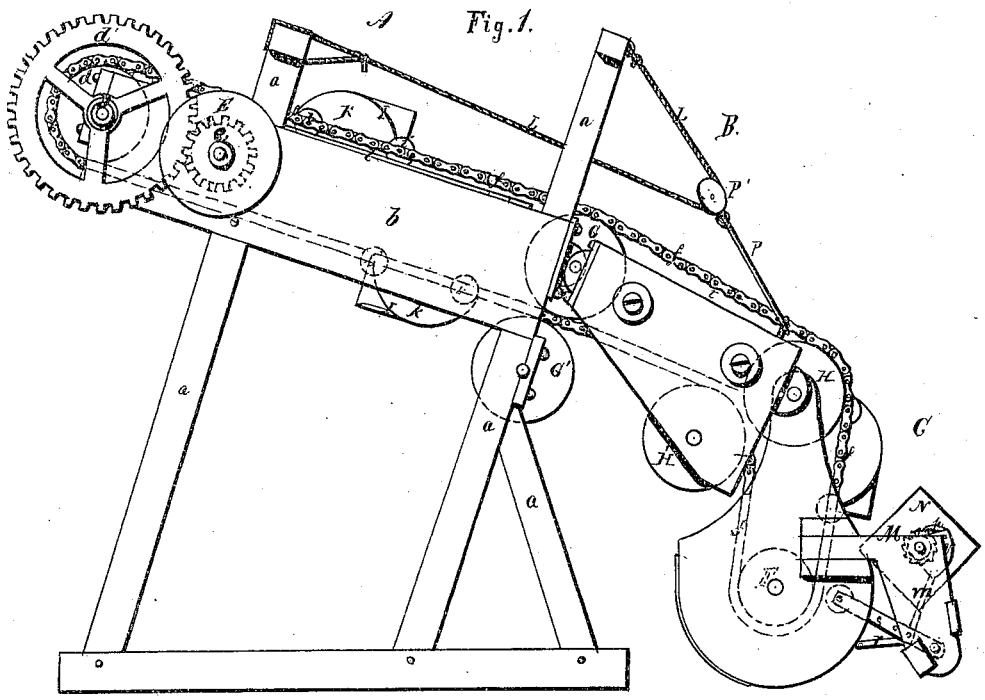
Figure 2:
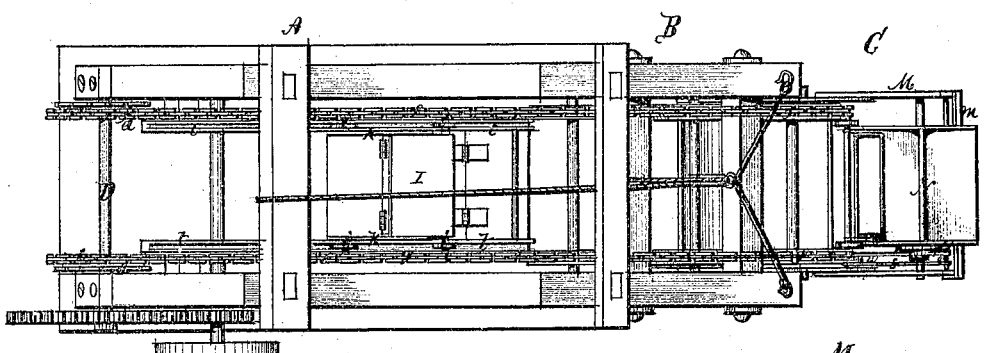
Figure 5:
Figure 4:
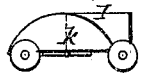
Figure 3:
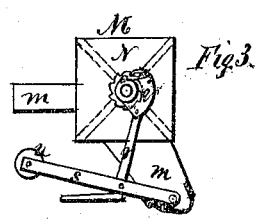

Figure 1 is a side elevation of my invention.
Figure 2 is a plan or top view of the same.
Figure 3 is a detached part of fig. 1.
Figure 4 is a truck or bucket detached.
Figure 5 is a transverse section of some.

General Description.

A B C represent the three jointed parts, which I will term sections. Section A supported in an inclined position by the frame-work $a$. To the lower end of section A is jointed section B, and to the lower end of section B is jointed section C.

Section A consists of two pieces $b\ b$, which are part of the frame. At the upper end of these pieces is the shaft D, carrying the rag-wheels $d$ and the cog-wheel $d'$, which cog-wheel meshes into a cog-wheel, $e$, indicated by the dotted lines in fig. 1. This latter cog-wheel $e$ is connected with the pulley E, to which power is applied to run the machine. The rag-wheels $d$ carry the endless chains $f$, two in number, which extend the entire length of the elevator, and pass around the cylinder F, indicated by the dotted lines in in section C of fig. 1.

The said endless chains pass over and are supported by the pulleys G and G', placed one above the other, at the joining of sections A and B, the shaft of the pulleys G forming the pivot of the joint. And the said endless chains pass over and are supported by other pulleys H and H', the shaft of the pulley H forming in like manner the pivot of the joint between sections B and C. There are two of each of the above-named pulleys, one set for each endless chain, each shaft supporting two pulleys.

I are the trucks or buckets for conveying the coal. Said trucks or buckets are attached, by means of a projection of the axle of their wheels $i$, to the endless chains, and are carried around by the said chains in their circuits. These trucks or buckets are jointed at about their center transversely, so that they can pass readily round the rag-wheels $d$ and cylinder F. This joint is clearly shown at $j$, fig. 5. The back part of these trucks or buckets is made in the shape of a box, with the top and bottom and three sides inclosed, but the front side is opened. To the front edge of the bottom of said box-like part is hinged the other half of the truck or bucket, consisting of a bottom piece, with two semicircular side pieces $k$, which lap past the sides of the above-described box-like part, as clearly shown in figs. 4 and 5, but are not attached thereto.

Owing to the arrangement of the pulleys G G' and H H', as above described, the sections B and C may be placed at any angle below the line of direction of section A, and the endless chains will remain parallel; that is to say, the upper or advancing part of the chain will be parallel to the lower or retiring part of the same, so that the said endless chains are kept always at the same degree of tension, whatever may be the position of the different sections.

The wheels of the trucks or buckets I, in passing over the sections B and A, run upon the tracks or tram-ways $t$, which continue up to the joint between the sections, and in passing round the cylinder F said wheels run in grooves cut therein.

The section C is constructed in the form of a semi-cylindrical case, inclosed upon one side and part of the bottom by the casing $l$, curved to conform to the course of the trucks or buckets. When the machine is in actual operation the section C will hang in a nearly perpendicular direction, as shown in fig. 1.

Attached to the section C, and projecting to the outer front thereof, is the feeding apparatus M, consisting of the frame-work $m$, in which is hung the revolving box N, said box being divided longitudinally into four compartments. Said division is indicated by the dotted lines in fig. 3.

To the shaft which carries said revolving box is affixed the ratchet-wheel $o$, with the pawl $p$ attached to the quadrant $q$.

Attached to said quadrant is the lever $r$, which connects with the lever $s$, which lever is attached to a fulcrum bearing in the frame-work $m$, and has at its outer end an idler or friction-pulley, $u$. This pulley lies in the path of the trucks or buckets, and as they pass is struck by the semicircular pieces $k$ and the lever $s$ elevated, which turns the box N and dumps the coal, which has been shoveled therein, into the truck or bucket, which has caused the action of the lever as above. After the truck or bucket is thus filled and carried on out of the way, the lever $s$ resumes, by its own weight, its former position, and the compartment of the box which remains uppermost is refilled with coal by an attendant, and is ready for another truck or bucket. This feeding attachment is only to be used in handling large or lump-coal. When small coal is handled this apparatus is not necessary, but the trucks or buckets will fill themseves, and the feeding apparatus may be taken off.

Immediately above the cylinder F there may be placed a guard-piece, which will extend from side to side of the semi-cylindrical casing and immediately beneath or behind the course of the trucks or buckets as they come from under the cylinder F. The office of this guard-piece will be to prevent coal from falling from the buckets over behind the cylinder, and thus clogging up the same.

By reason of the joints between the sections the elevator may be adjusted to any depth of hold, and the motion of a vessel at the dock while being unladen, caused by the rise and fall of the water, does not interfere in the least with the operation of this elevator. Even a considerable lateral motion will not interfere, so that a vessel may be unladen in a heavy sea with comparative ease.

To section B is attached a bale, P, extending from side to side, arched to allow the trucks or buckets to pass beneath it. To this bale is affixed the block and tackle P' L, for the purpose of raising and lowering and adjusting the sections B and C.

Claims.

I claim as my invention—

1. The elevator-frame, constructed as shown, with sections laying at different angles, so that the elevating buckets are carried more nearly perpendicular on some sections of the frame than on others.

2. The combination of the sections A, B, and C of the elevator frame, when hinged together, substantially as and for the purposes specified and shown.

3. The combination of the frame-work $a$ $b$, pulley E, cog-wheels $e$ and $d'$, rag-wheels $d$, endless chains $f$, pulleys G G' and H H', section C with its casing $l$, and the hoisting apparatus P P' L, constructed and operating substantially as specified and shown.

4. The combination of the elevating-truck or bucket I, wheels $i$, chain and tram-way or track $t$, substantially as and for the purpose specified.

5. The feeding apparatus M, substantially as and for the purpose specified and shown.

A. S. BAILEY.

Witnesses:
LEWIS L. COBURN,
J. W. MUNDAY.